(12) United States Patent
Clark et al.

(10) Patent No.: US 8,786,467 B2
(45) Date of Patent: Jul. 22, 2014

(54) METHODS AND SYSTEMS FOR FILTERING TRAFFIC INFORMATION FOR DISPLAY

(75) Inventors: Samuel T. Clark, Federal Way, WA (US); Roglenda R. Bowe, Maple Valley, WA (US); Stephen Bernard Ortman, Mill Creek, WA (US); Jean Marie Crane, Seattle, WA (US)

(73) Assignee: The Boeing Company, Chicago, IL (US)

( * ) Notice: Subject to any disclaimer, the term of this patent is extended or adjusted under 35 U.S.C. 154(b) by 664 days.

(21) Appl. No.: 13/051,146

(22) Filed: Mar. 18, 2011

(65) Prior Publication Data
US 2012/0130624 A1   May 24, 2012

Related U.S. Application Data

(63) Continuation-in-part of application No. 11/939,806, filed on Nov. 14, 2007, now abandoned.

(51) Int. Cl.
*G08G 5/00* (2006.01)
*G01C 21/00* (2006.01)
*G06G 7/76* (2006.01)
*G01S 13/00* (2006.01)

(52) U.S. Cl.
USPC ........... 340/958; 340/972; 340/971; 340/947; 340/991; 701/120; 701/10; 701/3; 701/457; 342/26 B; 342/29; 342/33; 342/64

(58) Field of Classification Search
USPC .......... 340/958, 972, 971, 947, 991; 701/120, 701/10, 3, 457; 342/26 B, 29, 33, 64
See application file for complete search history.

(56) References Cited

U.S. PATENT DOCUMENTS

| | | | |
|---|---|---|---|
| 6,694,249 B1 * | 2/2004 | Anderson et al. | 701/120 |
| 7,212,920 B1 * | 5/2007 | Bailey et | 701/457 |
| 7,222,017 B2 | 5/2007 | Clark et al. | |
| 7,755,516 B2 | 7/2010 | Clark et al. | |
| 7,796,055 B2 | 9/2010 | Clark et al. | |
| 7,932,853 B1 * | 4/2011 | Woodell et al. | 342/26 B |
| 7,963,618 B2 * | 6/2011 | Stone et al. | 301/16 |
| 8,264,378 B1 * | 9/2012 | Martins et al. | 340/979 |
| 2002/0089432 A1 * | 7/2002 | Staggs et al. | 340/945 |
| 2006/0265109 A1 * | 11/2006 | Canu-Chiesa et al. | 701/3 |
| 2008/0118051 A1 * | 5/2008 | Odinak et al. | 379/265.09 |
| 2008/0288166 A1 * | 11/2008 | Onishi et al. | 701/209 |
| 2009/0265090 A1 * | 10/2009 | Poe et al. | 701/120 |
| 2010/0283636 A1 | 11/2010 | Clark et al. | |
| 2011/0090096 A1 * | 4/2011 | Goh et al. | 340/972 |

* cited by examiner

*Primary Examiner* — Fekadeselassie Girma
(74) *Attorney, Agent, or Firm* — Ostrager Chong Flaherty & Broitman P.C.

(57) ABSTRACT

A method and a system for displaying an airport or runway moving map with traffic information on a display screen in the cockpit or flight deck of an aircraft. Symbology representing surface and near-surface aircraft and surface vehicle traffic and associated traffic data are filtered to prevent or limit clutter on the display screen. Traffic symbology is automatically and manually filtered to display only relevant traffic. Traffic data is selectively displayed and displayed as/when relevant or needed. The displayed traffic information may be derived from automatic dependent surveillance-broadcast, traffic information system-broadcast, automatic dependent surveillance-rebroadcast, traffic collision avoidance system or other source.

16 Claims, 13 Drawing Sheets

METHODS AND SYSTEMS FOR FILTERING TRAFFIC INFORMATION FOR DISPLAY

RELATED PATENT APPLICATION

This application is a continuation-in-part of and claims priority from U.S. patent application Ser. No. 11/939,806 filed on Nov. 14, 2007 and entitled "Multi-Function Switches for a Display".

BACKGROUND

The invention generally relates to systems and methods for displaying traffic information on a map. In particular, the disclosed embodiments relate to systems and methods for filtering the traffic information in order to prevent or limit clutter on a display screen.

Modern aircraft typically include cockpit displays that are controlled by an information system. Cockpit displays include the basic displays that are supplied with the aircraft, and other add-on displays which vary in their degree of integration with the physical aircraft structure and aircraft systems. In addition, some known aircraft include displays which provide a "virtual" display-based interface through which the crew controls aircraft systems.

To promote safety and efficiency, electronic moving maps in general, and an electronic airport moving map (EAMM) in particular, may be provided on cockpit displays. The EAMM provides a map of the airport surface with an ownship position depiction, and may include cleared taxi route, and other operational information, for example, automatic terminal information service (ATIS)/notice to airmen (NOTAM) information, runway status, runway exit info, traffic, alerting, and other features. The EAMM may display only runways and runway information (e.g., in the form of an electronic runway only moving map), or may provide runway, taxiway and other features and information. During taxi, takeoff, on approach and during landing/rollout, the EAMM may provide runway related information such as runway status and related traffic, traffic conflicts, braking, and runway exit information.

Current implementations of navigation display and EAMM display range selection are typically in whole number increments (for example, 640, 320, 160, 80, 40, 20, 10, 5, 2, 1, and 0.5 nautical mile ranges) such that intermediate display range selections between the whole number increments are not utilized. Range selection may be defined by specific rotary switch positions, or an infinitely rotating switch may be used with the range selections coded in software. Further, the manual setting of the display range may preclude display of traffic, areas or other objects of interest, or other information within or beyond the display range of the EAMM that may be important to safety and/or situational awareness.

Different information shown on such displays are controlled by a plurality of push button switches that can be accessed by a pilot. Typically these are momentary two state on/off pushbutton information switches. These on/off switches are provided to allow the selective "on demand" display of information, and to declutter the display of such information when it's not needed. These pushbutton switches typically display all or no information.

U.S. Patent Application Pub. No. 2010/0283636 discloses momentary multi-state/mode switches (e.g., all, some, or no information). In one implementation, "some" information display involves intermediate filtered or otherwise processed levels of information, that may dynamically change as a function of ownship or traffic-related time, position, circumstance, or other logic. In addition, state or mode information may be selected manually or could be selected utilizing more sophisticated automatic state/mode changes enabled by the selected switch state. The benefits of such switches are increased functionality within the same switch space as a conventional on-off momentary pushbutton switch. The switches also support new types of situational awareness displays and aircraft system control in addition to allowing for the manual control of such displays and systems.

The display of all traffic symbology and data on an airport or runway moving map can result in clutter that makes the display unusable at the display ranges used during taxi, takeoff and approach/landing. This clutter results from the typical map display scales/ranges of 0.5 to 10 nm and the large numbers of aircraft and vehicles on the airport available for display.

There is a need for a solution that is free of the drawbacks of existing solutions.

BRIEF SUMMARY

Various embodiments of an electronic airport moving map system for displaying runways and traffic are disclosed. The system comprises one or more computers or processors programmed with software for executing various filtering and display algorithms.

In accordance with one aspect, traffic data is displayed for taxiing, takeoff/departure, and approach/landing within an airport traffic zone. When ownship taxies into the ground relevant runway zone (GRRZ) of any runway, the EAMM system will additionally display a groundspeed datum, e.g., directly beneath the flight identifier, for all traffic in the ground runway operating zone (GROZ) or air runway operating zone (AROZ) of any relevant runway. In accordance with an alternative embodiment, when ownship taxies into the GRRZ of any runway, the EAMM system will additionally display a groundspeed datum (with the flight identifier) for all ground traffic in the GROZ of any relevant runway and a distance from ownship datum (with the flight identifier) for all airborne traffic in the AROZ of any relevant runway. The runway whose GRRZ ownship entered is flagged as a relevant runway.

In accordance with another aspect, when ownship speed is less than or equal to a certain threshold, the traffic symbols and traffic data to be displayed on an airport moving map are dependent on the state of a traffic switch. In a first switch state, symbols representing all air and all ground traffic are displayed with traffic data. The air and ground traffic is displayed per TCAS (traffic collision avoidance system) filtering rules. In a second switch state, symbols representing all air traffic and all ground traffic located in the GROZ of any runway are displayed. Also traffic data is displayed for all displayed traffic. In a third switch state, no air or ground traffic symbology or data is displayed, except for selected or coupled traffic, ADS-B alert traffic, and TCAS alert traffic.

In accordance with a further aspect, when ownship speed is greater than a certain threshold, the traffic symbols and traffic data to be displayed on the airport moving map are again dependent on the state of the traffic switch. In the first switch state, symbols representing air and ground traffic are displayed per TCAS filtering rules (e.g., above, normal, and below); symbols representing air traffic are displayed, and symbols representing ground traffic located in the GROZ of any runway and the proximate runway traffic zone (PRTZ) for ownship runway are displayed. All air and ground runway traffic data is also displayed. In the second switch state, the symbols displayed are the same as those displayed when the TFC switch is set to State 1, but no traffic data is displayed. In the third switch state, no air or ground traffic symbology or data is displayed, except for selected or coupled traffic, ADS-B alert traffic, and TCAS (traffic collision avoidance system) alert traffic.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Figure 1:
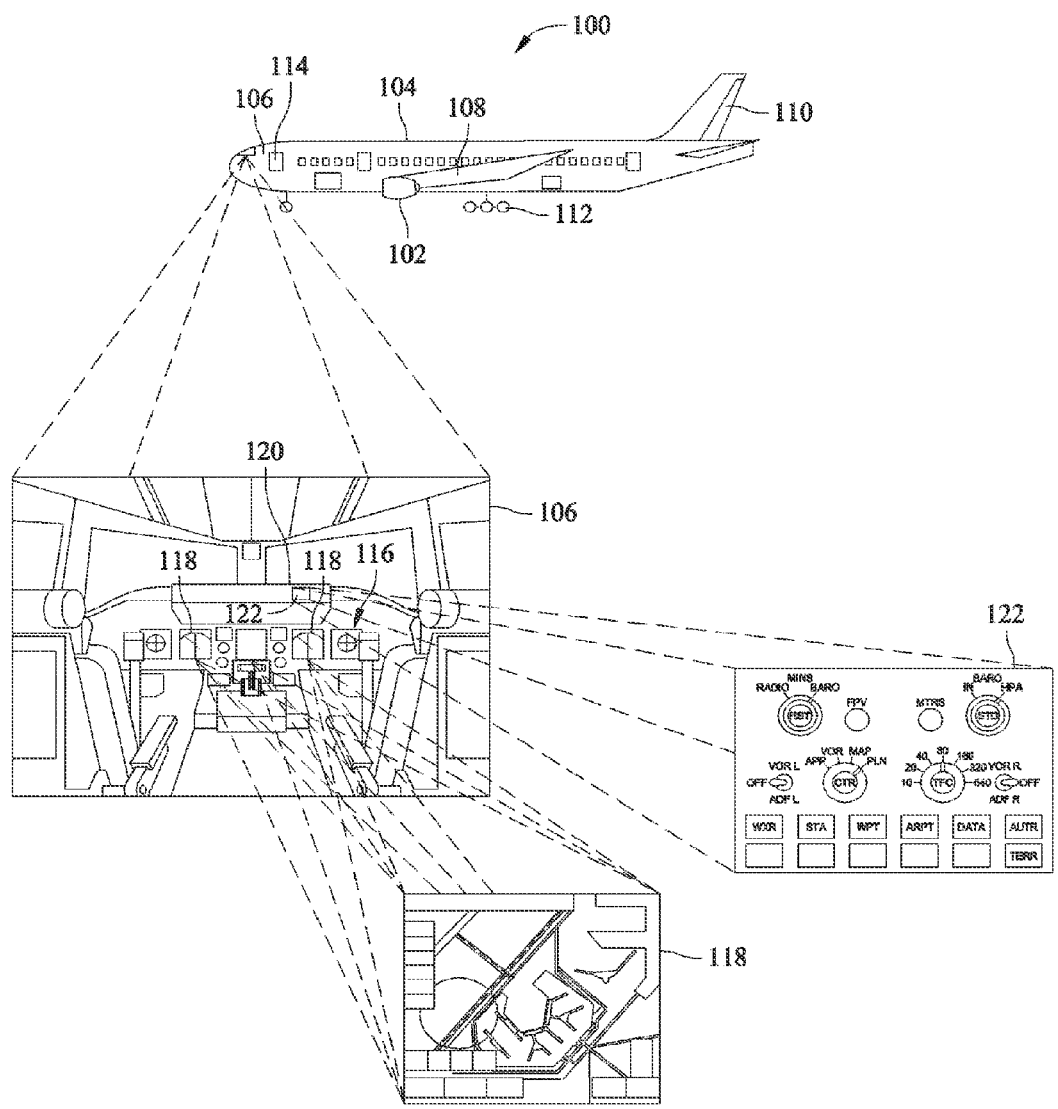
FIG. 1 is a composite diagram that includes a side elevational view of an airplane, an isometric view of a cockpit onboard the airplane, an image of an electronic airport moving map (EAMM) system available for viewing in the cockpit, and a front elevational view of an exemplary electronic flight information system (EFIS) control panel installed in the cockpit.

FIG. 1 is a side elevational view of a vehicle 100 such as an aircraft in accordance with one embodiment. Aircraft 100 includes one or more propulsion engines 102 coupled to a fuselage 104, a cockpit 106 in fuselage 104, wing assemblies 108, a tail assembly 110, a landing assembly 112, a control system (not visible), and a plurality of other systems and subsystems that enable proper operation of vehicle 100. At least one component of an EAMM system 114, configured in accordance with the present disclosure, is located within fuselage 104. However, components of EAMM system 114 may be distributed throughout the various portions, systems and subsystems of vehicle 100 and other components may also be located off board vehicle 100 and in communication with the onboard components.

Although vehicle 100 shown in FIG. 1 is generally representative of a commercial passenger aircraft, the inventive systems and methods disclosed herein may also be employed in virtually any other types of aircraft, other vehicles, or fixed base control stations. More specifically, the disclosed embodiments may be applied to other passenger aircraft, cargo aircraft, rotary aircraft, and any other types of aircraft. Also, alternate disclosed embodiments may be utilized in a wide variety of vehicles, including, ships, trains, and any other suitable vehicles, or in a wide variety of fixed base and/or non-moving applications such as air traffic control towers, and radar control and monitoring stations.

Cockpit 106 includes an aircraft cockpit display panel 116 that includes at least one display screen 118. In one exemplary embodiment, display screen 118 is positioned on the aircraft cockpit forward display panel 116. In an alternative embodiment, display screen 118 is positioned on an auxiliary side, overhead panel, or forward head-up display (not shown) located in the cockpit of the aircraft. During aircraft operation, display screen 118 is available for viewing by a pilot, co-pilot, and/or other flight deck occupant of the aircraft. Display screen 118 may be used to view data included in an electronic flight bag (not shown), which may be embodied as a standalone device such as, but not limited to, a personal data assistant (PDA) or a laptop personal computer, or as a software component of a system executing on a processor that is part of a subsystem of the aircraft. In the exemplary embodiment, an electronic flight bag or navigation display includes an electronic storage device configured to store various user-configurable flight-related objects for all required and desired information to display an aircraft's own position, runway status as well as map, traffic, and other information relevant to the movement of ownship aircraft. Data is received from various aircraft and ground sensors and systems. In particular, traffic information may be provided by ADS-B (automatic dependent surveillance-broadcast), TIS-B (traffic information system-broadcast), ADS-R (automatic dependent surveillance-rebroadcast), TCAS (traffic collision avoidance system) or other source. Route, traffic, runway, approach, and departure information based on the received data is determined in real-time, and the route, traffic, runway, approach, and departure information and/or alerts are displayed to the flight crew through display screen 118 and other cockpit 106 aural and/or visual indicators. Such runway, approach, and departure information provides the flight crew with additional situational awareness during aircraft operation. Cockpit displays include the basic displays that are supplied with the aircraft, and other add-on displays which vary in their degree of integration with the physical aircraft structure and aircraft systems.

Cockpit 106 also includes a glare shield 120 that includes at least one EFIS control panel 122 that is used to control a respective Primary Flight Display and/or Navigation Display (ND). EFIS control panel 122 includes controls for selecting autorange, various ND modes and ranges as well as switches which control the display of traffic and other information.

Figure 2:
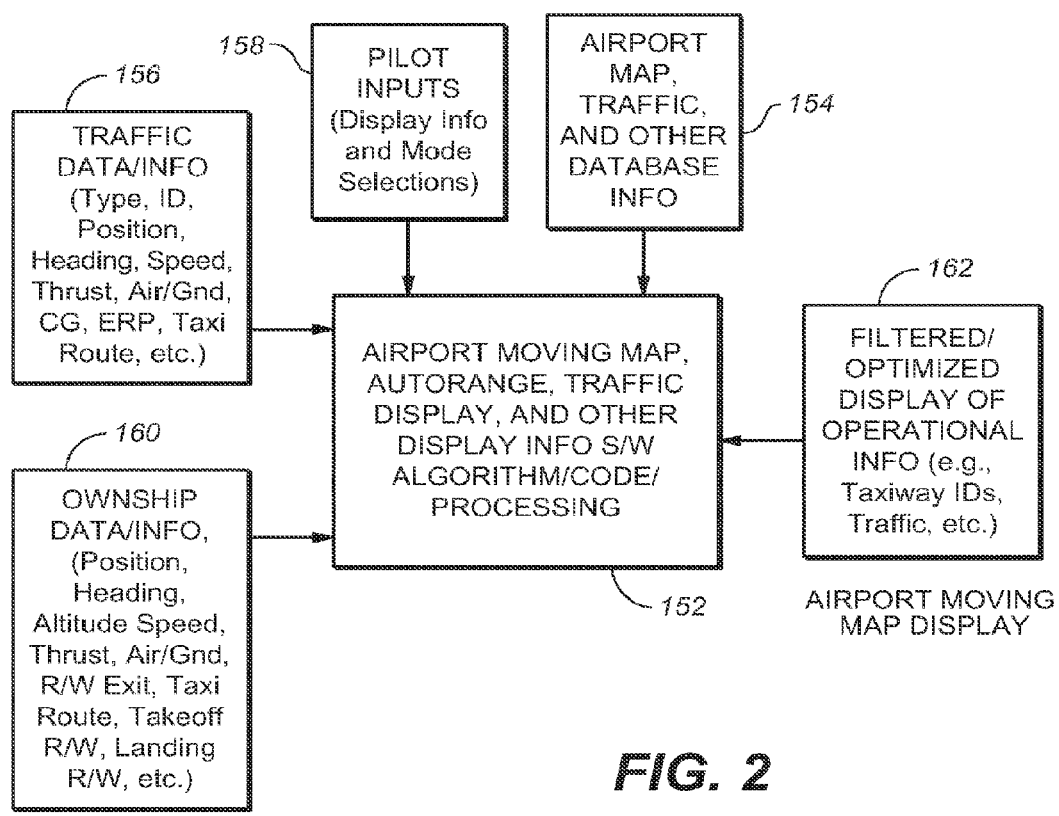
FIG. 2 is a schematic data flow diagram of an EAMM system in accordance with one embodiment disclosed herein.

FIG. 2 is a schematic data flow diagram of an electronic airport moving map (EAMM) system 114 for a vehicle in accordance with one embodiment. In this embodiment, an airport moving map module 152 of system 114 receives airport map data information 154, traffic data/information 156, pilot inputs 158, and ownship data/information 160 from respective modules and/or vehicle subsystems. Airport moving map module 152 then processes the collective data to define and activate the display of an optimized range for a graphic display screen 162 that includes a volume about one or more areas or items of interest, for example, but not limited to an airport. Airport moving map module 152 also monitors other vehicle positions and movements as well as the position of stationary objects proximate the area of interest for display on an airport moving map display screen 162. Based on EFIS panel pilot inputs and other inputs, airport moving map module 152 controls the manual and automatic display of traffic information. The airport moving map module preferably comprises software that is executed by a computer system, which system may comprise a single computer or processor, or two or more interconnected computers or processors.

Traffic data/information 156 includes data regarding the type, identification, position, speed, thrust, and taxi route of one or more vehicles, as well as data as to whether each vehicle is on the ground or airborne. In particular, due to the large dimensions of some traffic vehicles, e.g., commercial passenger aircraft, the position of each traffic vehicle may be further defined as the operator eye reference point (ERP) in each vehicle. In other words, the position of a traffic vehicle may be further pinpointed as the position within the vehicle occupied by the operator. In alternative embodiments, the position of a traffic vehicle may be defined as the vehicle's center of gravity (CG) or the position of its GPS receiver. Alternatively, for a traffic vehicle that is an aircraft, the position of a traffic vehicle may be pinpointed to the approximate longitudinal and bilateral center of the aircraft's fuselage or wing. Nevertheless, the position of a traffic vehicle may also be defined in alternative ways, such as by an imaginary envelope encompassing the most distal point or points of the traffic vehicle. Having positional information for such traffic is a prerequisite to the display or filtering of symbology representing such traffic on a display screen.

Ownship data/information 160 includes data regarding the type, identification, position, heading, speed, thrust, taxi route, as well as data indicating whether the aircraft is on ground or airborne. Again, the position of ownship may be defined as its ERP, CG or other suitable alternatives, such as by an imaginary envelope encompassing the most distal point or points of the aircraft. One or more of ownship data/information and EFIS control panel switch states are a prerequisite to the display or filtering of such information as runway status, taxiway identifiers and traffic symbology. Furthermore, EAMM system 114 may use determinations of runway status together with ownship data/information and EFIS control panel autorange switch state to determine autorange activation and range selection.

In general, airport moving map module 152 determines runway occupancy for each runway based on one or more of traffic vehicle positions, ownship position, traffic and ownship headings, speed, time and distance separations, other logical conditions, and a monitored area(s) or volume(s) defined around each runway of interest or other vehicle path. Information for defining a monitored area or volume (e.g., see the zones defined below) with respect to each runway may be supplied by Airport or Runway Map Database 154. In one embodiment, the two-dimensional monitored area(s) and the three-dimensional monitored volume(s) are established with respect to the length of the runway, the width of the runway, and a predetermined height above the runway. In a further embodiment, the monitored area or volume dimensions extend a predetermined distance to the left and right of runway centerline, extend a predetermined distance beyond each runway threshold, and extend to a predetermined height above ground level. In an additional embodiment, the dimensions and the shape of the monitored area or volume may be varied as a function of estimated, calculated or required time of traffic or ownship arrival to the runway corresponding to the monitored volume. The dimensions and shape of the monitored area or volume may also be varied to support effective implementation of traffic display/filtering, such as to accommodate operational needs, unusual or non-linear airport runway, taxiway, approach and departure path configurations, as well as for other applications such as runway status determinations and traffic conflict alerting. Airport moving map module 152 utilizes runway, traffic and ownship data/information, and EFIS control panel switch states to determine the display or filtering of map information such as runway status, taxiway identifiers, and traffic symbology and data, and to control the activation and behavior of such functions as autorange. For example, the airport moving map module 152 may comprise a software submodule retrieving current runway status, traffic and ownship information from computer memory, a software submodule for processing that information to determine (as a function of at least EFIS control panel switch states) what symbols and data should be displayed on the EAMM display screen, and a software submodule for controlling the display screen to display selected symbols and associated data. Each of these submodules may run on respective processors that communicate with each other.

Figure 3:
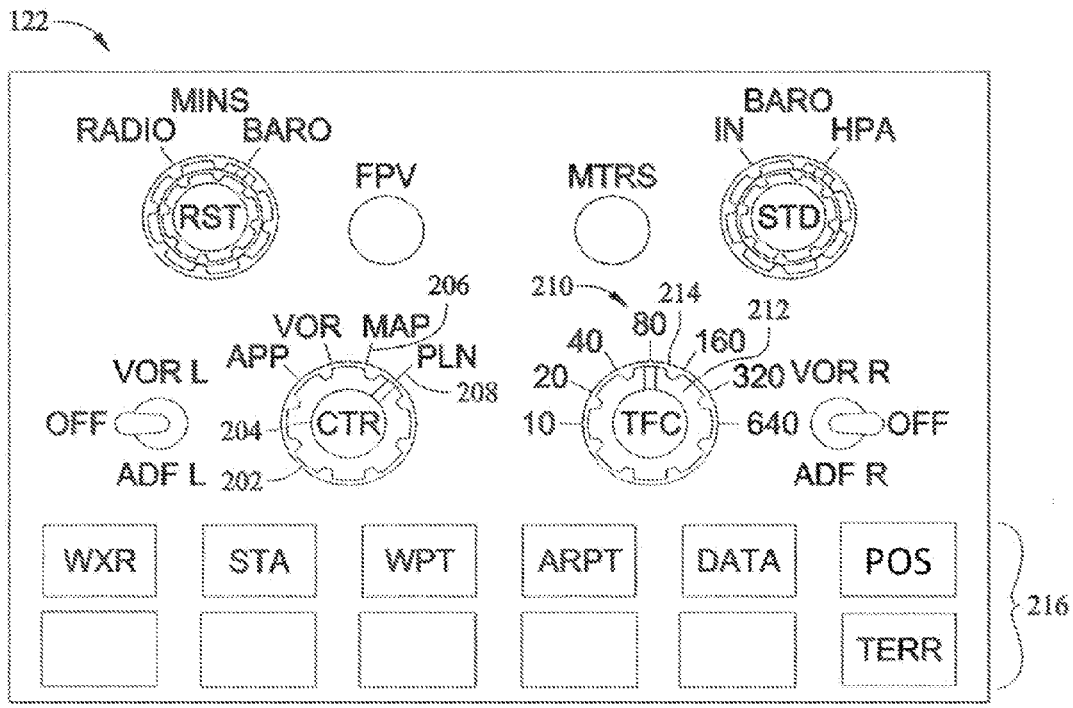
FIG. 3 is a front elevational view of an exemplary EFIS control panel that may be used with the EAMM shown in FIG. 1.

FIG. 3 is a front perspective view of an exemplary EFIS control panel 122 that may be used with the EAMM system previously described. The control panel includes a plurality of momentary push button switches that can be utilized to control the activation of functions and the display of information on the EAMM system. EFIS control panel 122 includes an ND Mode Selector 202 for selecting a track up or a North Up map display orientation and a CTR Switch 204 for selecting centered or expanded mode map display. CTR Switch (inner) 204 when pushed, centers the display on ownship and displays full compass rose. Subsequent pushes alternate between expanded and centered displays. ND Mode Selector (outer) 202 includes a MAP position 206 for selecting Track Up map orientation, and a PLN position 208 for selecting North Up map orientation. MAP position 206 provides FMC-generated (i.e., generated by the flight management computer) route and map information, airplane position, heading and track displayed in Track Up format. PLN position 208 provides a stationary North Up map depiction. In all modes, a colored triangular symbol represents the ownship position and orientation.

EFIS control panel 122 further includes an ND Range Selector and TFC switch 210 that includes an TFC (traffic) switch (inner) 212 that, when pushed, displays traffic information on the ND and a ND Range Selector (outer) 214 that is used to manually select the desired ND nautical mile range scale. A plurality of MAP switches 216 select or remove detailed ND information. More than one MAP switch 216 may be selected at a time.

The TFC switch 212 may be embodied in a three-state pushbutton switch that is selectable to cycle through states that display all, some, and no traffic depictions in turn, or display all some or no traffic data in turn. Traffic depictions may be used to display symbols representing one or more of ground and/or airborne traffic that is taxiing, approaching a runway, on a runway, departing a runway, or landing and rolling out on a runway. As TFC switch 210 is depressed, more or less traffic information is displayed to the flight crew. When the "all" switch state (i.e., State 1) for traffic display is selected, symbols representing all traffic will be displayed. When the "some" switch state (i.e., State 2) for traffic is selected, symbols representing only that traffic that is determined to be relevant to ownship operation (e.g., related to current ownship position and orientation and/or associated with all runways, certain selected runways and/or taxiways and/or a potential or actual conflict with ownship) is displayed. Symbols representing other traffic may also be displayed based on predetermined logic and/or selectable parameters. When the "none" switch state (i.e., State 3) for traffic is selected, all traffic indication is turned off with the possible exception of alert-related traffic that is in actual or impending conflict with ownship, or is selected or otherwise designated for special operations. Traffic that is offscale and is determined to be a threat or conflict or potential threat or conflict with ownship may activate an offscale indication of said traffic.

The state of the TFC switch may be included/shown on the EAMM display screen, e.g., TFC ALL (when State 1 is selected), TFC FILT (when State 2 is selected), and no indication when State 3 is selected. When the TFC switch is set to State 1, the EAMM display screen will show all airport traffic. When State 2 is selected, less than all traffic will be shown. When State 3 is selected, no traffic is displayed.

Although not shown in the drawings, the cockpit of a commercial aircraft typically has a TCAS traffic filtering transponder switch control. The TCAS is currently available today. The combination of TCAS and ADS-B is planned for the future. Most/all commercial transport aircraft in the future will be TCAS+ADS-B because TCAS is required for those aircraft and ADS-B does not substitute for TCAS alerts. ADS-B is mandated to occur on all aircraft by about 2020. The TCAS control panel currently filters the traffic display on the Navigation Display as a function of ownship altitude. There are three selections: Above, Normal and Below. These selections define altitude bands with limits above and below ownship altitude outside of which traffic is not displayed. Display of air traffic within this altitude band is then prioritized. The bands are typically: +9900/−2700 feet of ownship altitude for Above; ±2700 feet of ownship altitude for Normal; and +2700/−9900 feet of ownship altitude for Below. TCAS (the current state of affairs) does not allow the display of ground traffic. ADS-B traffic display changes that. In either case (TCAS or ADS-B) the TCAS panel filtering switch controls the display of traffic, but is qualified by further inhibits such as no display of ground TCAS traffic.

Hereinafter, when this disclosure states that an airplane on the ground is located within or inside an area, it means that a particular point (e.g., the ERP, CG or GPS receiver) on the airplane has longitudinal and latitudinal coordinates within the boundaries of that area. Each area, in turn, can be defined by the longitudinal and latitudinal coordinates of its boundaries. In the case where an area is a quadrilateral, the coordinates of the area boundaries can be readily determined from the longitude/latitude coordinates of the corners or vertices of the quadrilateral. Software for determining whether a point lies within an area using a longitude/latitude coordinate system is well known.

An airborne vehicle can be located using different well-known systems. For example, the onboard navigation system may use GPS signals to determine latitude/longitude coordinates and an output signal from a pressure altimeter to determine barometric altitude. It is well known to translate a vehicle position from latitude/longitude/altitude to the Earth Centered Earth Fixed (ECEF) reference frame. The ECEF coordinate system represents positions using X, Y and Z coordinates. The point (0,0,0) is defined as the center of mass of the Earth. The axes of the ECEF coordinate system are aligned with the International Reference Pole and International Reference Meridian, which are fixed with respect to the surface of the Earth. The ECEF frame of reference rotates with the Earth.

As used herein, to state that an airplane is located within or inside a volume means that a particular portion of the airplane has latitude/longitude coordinates and an altitude or has ECEF coordinates which place a particular portion of the airplane within the boundaries of that volume. Each volume, in turn, can be defined by the longitude/latitude coordinates and altitude or ECEF coordinates of its boundaries. In the case where a volume is rectilinear, the coordinates of the boundaries can be readily determined from the coordinates of the corners or vertices of the rectilinear volume. Software for determining whether a point lies within a volume using a longitude/latitude/altitude or ECEF coordinate system is well known.

Before undertaking a detailed description of traffic display systems in accordance with various embodiments of the invention, various terminology needs to be defined. In particular, this disclosures refers to various runway and operating zones which require definition.

Figure 4:
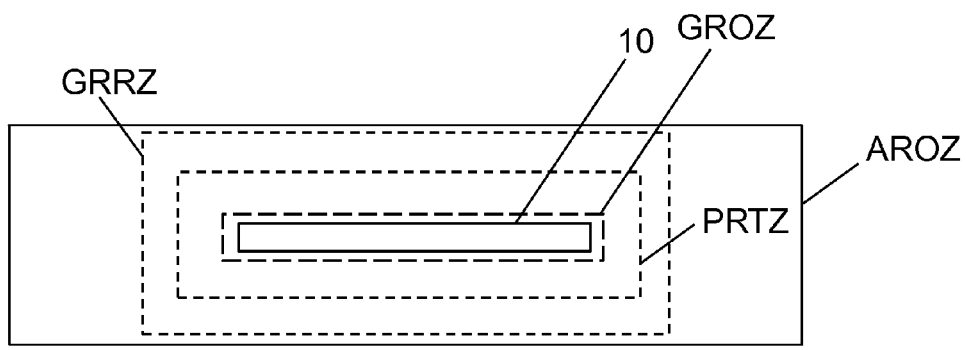
FIG. 4 is a diagram showing a runway and various overlapping zones having extents defined with respect to the centerline of that runway.

FIG. 4 is a diagram showing a runway 10 and various overlapping zones having extents defined with respect to the centerline of that runway. The names and descriptions of these zones are as follows:

Ground Relevant Runway Zone (GRRZ) refers to an area that overlies and extends laterally and longitudinally beyond the limits of runway 10. In various embodiments of the traffic display system software, the GRRZ extends ±800 to ±1500 feet from the runway centerline (not shown), and extends 800 to 1500 feet beyond the runway thresholds. (As used herein, the symbol "±" indicates that the zone extends on both sides of the runway centerline.) The GRRZ defines a relevant runway based on ownship ground position. A runway is relevant if the on-ground ownship position is inside that runway's GRRZ. The GRRZ is used for traffic filtering, data and offscale display.

Ground Runway Operating Zone (GROZ) refers to an area that overlies and extends laterally and longitudinally beyond the limits of runway 10. In various embodiments of the traffic display system software, the GROZ extends ±150 to ±350 feet or more from the runway centerline (i.e., 50 to 100 feet or more beyond the runway edges), and extends 50 to 100 feet or more beyond the runway ends. The GROZ is used to differentiate runway and non-runway ground traffic based on ground traffic position. (Runway traffic is traffic on or near a runway because of uncertainty in the current GPS-reported traffic position.) Ground traffic inside a GROZ is considered associated runway traffic. The GROZ is used for runway traffic filtering, data, and offscale display. It is also used to define ownship runway. In an alternative embodiment, the GROZ may be a volume of height 50 to 200 feet or more above the runway or airport elevation.

Air Runway Operating Zone (AROZ) refers to a volume that overlies and extends laterally and longitudinally beyond the limits of runway 10. In various embodiments of the traffic display system software, the AROZ extends ±400 to ±2000 feet or more from the runway centerline. In the elevational direction, the AROZ may extend to 1000 to 3000 feet above field elevation. The AROZ preferably extends 3 to 7 nm beyond the runway thresholds. The AROZ could extend laterally beyond the GRRZ. The AROZ is designed to detect traffic and ownship on approach, and it must accommodate both the GPS position uncertainty and the flight technical error (normal lateral deviation from the extended runway centerline). Further, the GRRZ is likely to be smaller rather than larger in the lateral direction. The AROZ defines airborne runway traffic based on traffic position and track. Airborne traffic inside and aligned with an AROZ is considered associated runway traffic. The AROZ is used for traffic data, offscale traffic and traffic conflict displays. The AROZ also defines a relevant runway based on ownship airborne position and heading/track. The AROZ is also used to define ownship runway.

Proximate Runway Traffic Zone (PRTZ) refers to an area having a boundary outside and within a predetermined distance of the GROZ, e.g., ±200 to ±1500 feet from the runway centerline. Ground traffic located within a PRTZ is referred to herein as "proximate runway traffic." The PRTZ defines ground runway related traffic based on traffic position. The PRTZ is used for traffic filtering and data display.

Airport Traffic Zone (ATZ) refers to a volume that overlies and extends laterally and longitudinally beyond the limits of runway 10. In the elevational direction, the ATZ may extend from the ground to 3000 feet above field elevation. The ATZ preferably extends 7 to 9 nm from the airport reference point. Ground traffic is only displayed when ownship is within the ATZ. The ATZ is established to detect and define ownship and/or traffic are accomplishing an airport-related operation (taxi, takeoff, approach/landing, etc.)

The ranges set forth above are approximate and intended to provide a sense for the possible zone sizes. In view of the above-defined zones, other terms used herein are defined as follows:

As used herein, the term "ownship runway" refers to a runway for which ownship is in the GROZ or AROZ and ownship track is aligned within ±30 degrees of the runway centerline. (Note: As explained below, ownship runway is also a "relevant runway".) In accordance with the embodiments disclosed herein, the EAMM display screen may be used to display proximate runway traffic for the ownship runway only, i.e., ground traffic near but not in the GROZ of the ownship runway.

As used herein, the term "relevant runway" refers to a runway that satisfies one or more of the following criteria: 1) ownship runway (as previously defined) and any runways intersecting ownship runway; 2) any runway where ownship is in the GRRZ; and 3) any closely spaced parallel (CSP) runway to ownship runway. Preferably, a runway having a centerline which is within d feet of ownship runway's centerline is a CSP runway if d is 1200 feet or less.

In summary, runways are relevant when ownship is in the GRRZ on ground, in the GROZ on ground, or in and aligned with the AROZ in air. Once ownship is in and aligned with a GROZ or AROZ, that runway becomes an ownship runway; and all runways intersecting ownship runway and all runways CSP to ownship runway are relevant. CSP runways are also relevant when ownship is in a GRRZ and a CSP runway exists.

Figure 5:
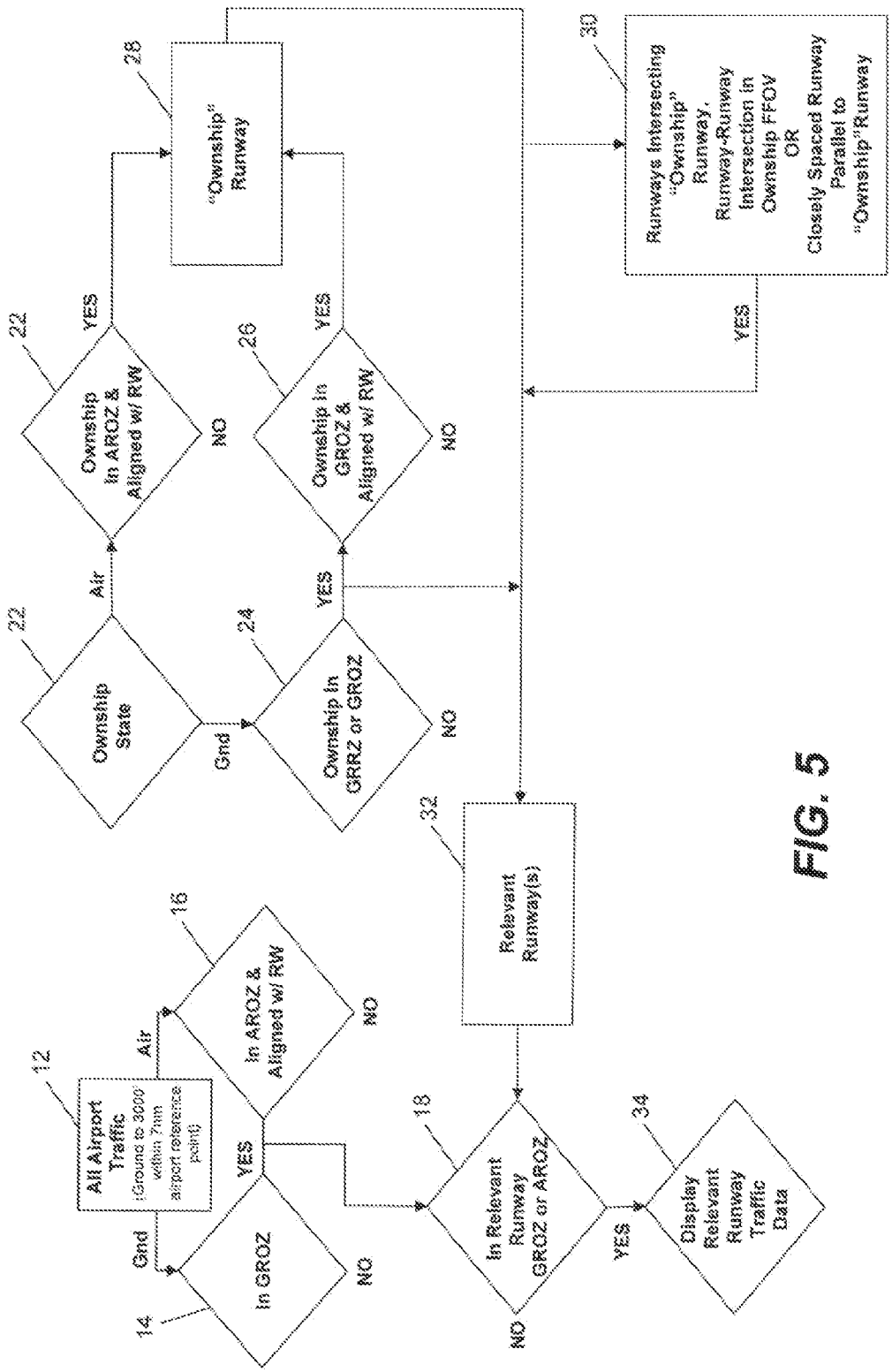
FIG. 5 is a flowchart showing steps in the process of determining relevant runway traffic for display

As used herein, the term "ground runway traffic" refers to traffic in the GROZ of any runway; the term "air runway traffic" refers to traffic in and aligned with the AROZ of any runway; the term "ground relevant runway traffic" refers to traffic in the GROZ of only relevant runways; and the term "air relevant runway traffic" refers to traffic in and aligned with the AROZ of only relevant runways. Ground relevant runway traffic is a subset of ground runway traffic. When only one runway exists, they are the same provided the runway is relevant. FIG. 5 is a flowchart showing an algorithm for determining relevant runway traffic for display. The state of ownship is determined in step 20. If ownship is airborne, then a determination is made in step 22 whether or not ownship is in the AROZ and aligned with the centerline of any runway. If "Yes," then that runway is flagged as being the ownship runway in step 28 and is further flagged as being a relevant runway in step 32. If the outcome of step 22 is "No," then no further action is necessary.

Still referring to FIG. 5, if step 20 determines that ownship is on the ground, then a determination is made in step 24 whether or not ownship is in the GRRZ or GROZ of any runway. If "Yes," then any such runways are flagged as being relevant runways in step 32. If the outcome of step 24 is "No," then no further action is necessary.

If step 24 determines that ownship is in the GRRZ or GROZ of any runway, then a further determination is made in step 26 whether ownship is in the GROZ and aligned with the centerline of any runway. If "Yes," then that runway is flagged as being the ownship runway in step 28 and is further flagged as being a relevant runway in step 32. If the outcome of step 26 is "No," then no further action is necessary.

After the ownship runway has been identified, step 30 determines whether there are any runways intersecting ownship runway with the runway-runway intersection being in ownship forward field of view (FFOV), and/or any closely spaced runways parallel to ownship runway. If "Yes," then all such runways are flagged as being relevant runways in step 32. Intersecting runways must be further qualified. To be relevant, the runway-runway intersection must be in ownship FFOV. Runway-runway intersections behind ownship are not relevant as ownship-traffic convergence (and therefore conflict) is not possible.

The embodiment shown in FIG. 5 further comprises a step 12 whereby all airport traffic is identified that is located within 7 nm of the airport reference point (ARP), including ground traffic and any air traffic at an altitude of 3000 feet or less. For all ground traffic, a determination is made in step 14 as to whether the traffic is located in a GROZ of any runway. For all air traffic, a determination is made in step 16 as to whether the traffic is located in an AROZ and aligned with the centerline of any runway. For all traffic for which the result of the foregoing determinations was "Yes," a determination is then made in step 18 whether such traffic is located in the GROZ or AROZ of a relevant runway. Symbology and data for this relevant runway traffic are then displayed (step 34 in FIG. 5) on the EAMM display screen.

In accordance with the foregoing embodiment, when ownship is located within the ATZ of an airport and below 80 kts speed, the EAMM display screen displays airborne traffic and ground traffic, including runway and non-runway ground traffic. Ground traffic may include aircraft and other vehicles commonly operating at airports, such as trucks. For each aircraft in the air or on the ground within the area covered by the EAMM, the EAMM display screen displays an aircraft symbol and a respective flight identifier in proximity to each other. Each aircraft symbol is positioned and oriented relative to the depicted runways to reflect the actual position and orientation of the actual aircraft relative to those runways. Traffic display and filtering is not based on taxiway database knowledge or taxi route knowledge. Instead, the display methods disclosed herein only require runway data (e.g., runway end location, length, width and bearing). Display and filtering strategy can be done with either an airport moving map or a runway moving map. The maximum number of traffic symbols displayed may be limited to some predetermined value (e.g., 32).

The EAMM display screen displays aircraft symbology with or without data, depending on the state of the TFC switch and the location and speed of ownship. In accordance with one exemplary embodiment disclosed herein, when ownship speed is >80 knots, the TFC switch controls traffic data display on/off: State 1 (on), States 2 and 3 (off), and traffic symbology display on/off: States 1 and 2 (on), State 3 (off); whereas when ownship speed is 580 knots, the TFC switch controls ground traffic symbology and any accompanying data display on/filtered/off: State 1 (on), State 2 (filtered), State 3 (off).

The operation of the EAMM system when the TFC switch is set to State 1 will now be described for the following circumstances: (1) ownship is on the ground outside any GRRZ; (2) ownship then taxies to a position inside a GRRZ of a runway; (3) ownship then taxies into and aligns with the centerline of the GROZ of ownship runway; (4) ownship then exceeds a speed threshold during take-off from ownship runway; (5) ownship exits the GRRZ of ownship runway; and (6) ownship flies away from the airport and out of the ATZ. Then the system's operation when the TFC switch is set to State 2 will be described for the same set of circumstances. The sequence of operations are simply reversed for the situation where ownship is landing instead of taking off.

When the TFC switch is set to State 1 and ownship is on the ground at an airport, but outside of the GRRZ of any runway, the EAMM system will display symbols for all ATZ air traffic (ADS-B and TCAS) and all ground traffic displayed per TCAS filtering (above, normal, below) and traffic data (i.e., at least flight identifiers) for all displayed ADS-B traffic. This means that all air (TCAS and ADS-B) and all ground (TCAS and ADS-B) traffic display is controlled by the (Above, Normal, Below) switch state which specifies an altitude band above and below ownship outside which traffic is not shown. In addition to traffic filtering (above, normal, below), ground TCAS traffic is never displayed. But ground ADS-B traffic can be displayed if its data quality (position, velocity, etc) meets certain minimum requirements.

In accordance with one embodiment, when ownship taxies into the GRRZ of any runway, the EAMM system will additionally display a groundspeed datum, e.g., directly beneath the flight identifier, for all traffic in the GROZ or AROZ of any relevant runway. In accordance with an alternative embodiment, when ownship taxies into the GRRZ of any runway, the EAMM system will additionally display a groundspeed datum (with the flight identifier) for all traffic in the GROZ of any relevant runway and a distance from ownship datum (with the flight identifier) for all traffic in the AROZ of any relevant runway. The runway whose GRRZ ownship entered is flagged as a relevant runway.

If the ownship then taxies to a position and orientation such that it is in the GROZ of a runway and aligned with its centerline, then the EAMM system flags that runway as being the ownship runway (and a relevant runway). Additional relevant runways are also identified, as previously described with reference to FIG. 5.

Ownship then takes off from ownship runway. During take-off, the speed of ownship increases until a preset threshold (e.g., 80 knots) is exceeded. If this groundspeed threshold is exceeded while the TFC switch is still set to State 1, then symbols for all ATZ air traffic are still displayed per TCAS filtering (i.e., only air traffic within the selected altitude band is available for display), while ground traffic is automatically filtered to display only symbols representing ground traffic in the GROZ of any runway (i.e., ground runway traffic) and, optionally, ground traffic in the PRTZ of ownship runway. In addition to limiting the maximum number of total traffic displayed, there are also ground and air traffic prioritizations that ensure a minimum number of air and a minimum number of ground traffic are displayed within the limit of the previously mentioned maximum number of total traffic display allowed. Also traffic data (e.g., flight identifier) is displayed for all displayed traffic, and additional traffic data (e.g., groundspeed or distance data) is displayed for all displayed relevant runway traffic.

On takeoff, upon ownship leaving the GRRZ of ownship runway it enters the AROZ and traffic data remains displayed as described provided the runway remains qualified as an ownship runway. Upon leaving the AROZ or no longer being aligned with the runway, all air and ground runway traffic with identifiers only is once again displayed. Finally, when ownship exits the ATZ, further display of ground traffic is terminated.

When the TFC switch is set to State 2, and ownship is on the ground at an airport, but outside of the GRRZ of any runway, the EAMM system will display symbols for all ATZ air traffic, symbols for all ground traffic in the GROZ of any runway (i.e., all ground runway traffic), and traffic data (i.e., at least flight identifiers) for all displayed traffic. When ownship taxies into the GRRZ of any runway, the EAMM system will additionally display a groundspeed datum, e.g., directly beneath the flight identifier, for all traffic in the GROZ or AROZ of any relevant runway. Alternatively, when ownship taxies into the GRRZ of any runway, the EAMM system will additionally display a groundspeed datum (with the flight identifier) for all traffic in the GROZ of any relevant runway and a distance from ownship datum (with the flight identifier) for all traffic in the AROZ of any relevant runway. The runway whose GRRZ ownship entered is flagged as a relevant runway.

Still referring to State 2 of the TFC switch, if the ownship then taxies to a position and orientation such that it is in the GROZ of a runway and aligned with its centerline, then the EAMM system flags that runway as being the ownship runway (and a relevant runway). Additional relevant runways are also identified, as previously described with reference to FIG. 5.

Ownship then takes off from ownship runway. During take-off, the speed of ownship increases until a preset threshold (e.g., 80 knots) is exceeded. If this groundspeed threshold is exceeded while the TFC switch is still set to State 2, then the traffic display will be the same as for State 1, except that no traffic data (not even flight identifiers) is displayed.

Upon ownship leaving the GRRZ of ownship runway while the TFC switch is set to State 2, it enters the AROZ and traffic data remains displayed as described provided the runway remains qualified as an ownship runway. Upon leaving the AROZ or no longer being aligned with the runway, all air traffic and all ground runway traffic with only identifiers is once again displayed. Finally, when ownship exits the ATZ, further display of airport traffic is terminated.

When the TFC switch is in State 3, then no air or ground traffic or traffic data is displayed, except for selected or coupled traffic, and TCAS or ADS-B alert traffic. This is true independent of ownship speed.

Various features described above will now be illustrated with reference to FIGS. 6 through 15. For the sake of simplicity, these images show neither airborne traffic nor non-flight vehicles. In other words, these exemplary partial screen shots only show ownship on the ground and other ground runway traffic. Also, although an EAMM system can display symbols in color, all images herein are black and white only. Air and ground traffic are differentiated by shape, color, and other means not necessarily described herein.

Figure 6:
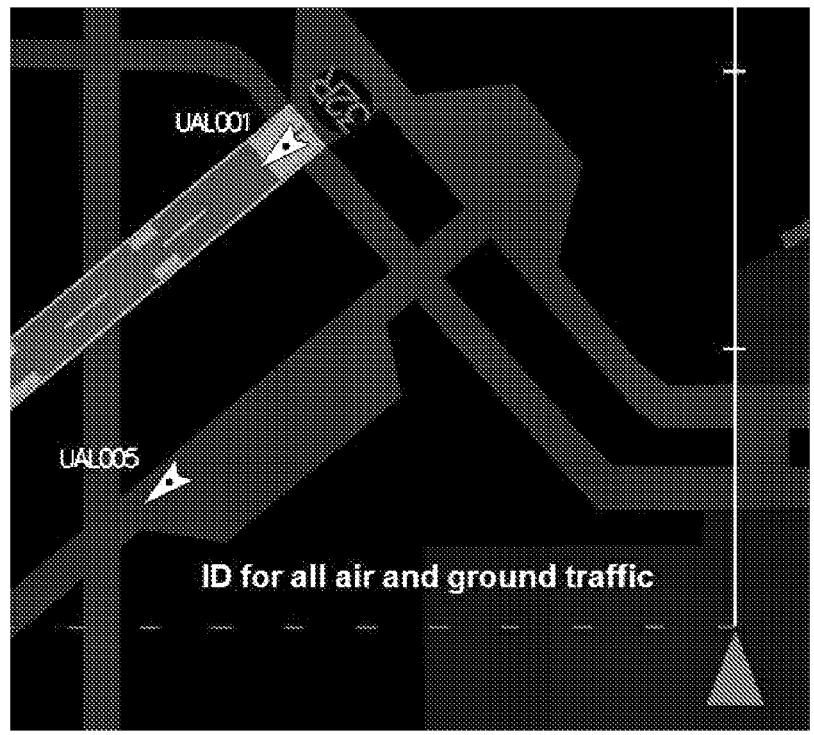
FIGS. 6 and 7 are diagrams depicting respective partial screen shots from an exemplary EAMM displayed on a cockpit display screen, the screen shots of FIGS. 6 and 7 being respectively displayed prior to and subsequent to ownship entering a GRRZ of a runway in accordance with one embodiment disclosed herein.
Figure 7:

FIGS. 6 and 7 are diagrams representing partial screen shots from a cockpit display screen that is displaying an EAMM. These diagrams show the position of ownship (indicated by a Δ symbol) relative to a runway named 32R at two different times during an interval of time. Assume for the purpose of this example that throughout this time interval, the TFC switch is set to State 1 (i.e., without filtering of the type disclosed herein).

FIG. 6 depicts a portion of a screen shot of an EAMM display screen when ownship is outside the GRRZ of runway 32R. In contrast, FIG. 7 depicts a portion of another screen shot, displayed at a later time, when ownship is inside the GRRZ of runway 32R. In other words, ownship has moved from the position and orientation relative to runway 32R depicted in FIG. 6 to the position and orientation relative to runway 32R depicted in FIG. 7, i.e., has taxied closer to the runway. Upon the entry of ownship into the GRRZ of runway 32R, runway 32R is deemed to be a relevant runway. Because the frame of reference of the EAMM is ownship, the position and orientation of the runway will change on the screen as ownship moves and/or turns.

With the TFC switch in State 1 and ownship outside the GRRZ of runway 32R, the partial screen shot seen in FIG. 6 shows an aircraft symbol labeled UAL001 representing Flight UAL001 on runway 32R and an aircraft symbol labeled UAL005 representing Flight UAL005, which is not on any runway. In this mode of operation (i.e., the TFC switch in State 1), the EAMM display system will display a respective flight identifier in proximity to each aircraft symbol.

However, when ownship taxies from outside the GRRZ to inside the GRRZ of runway 32R (the TFC switch is still in State 1), the partial screen shot seen in FIG. 7 shows the same aircraft symbols labeled UAL001 and UAL005 respectively with some additional data. In this example, the additional data is the groundspeed (in this example, 0) of Flight UAL001, which qualifies as ground relevant runway traffic.

The EAMM system producing the images shown in FIGS. 6 and 7 is programmed to display groundspeed data for all ground relevant runway traffic (i.e., ground traffic in the GROZ of all relevant runways) in response to ownship entering the GRRZ of runway 32R. As seen in FIG. 7, groundspeed data is not displayed for Flight UAL005 because that aircraft, based on its location (i.e., not in the GROZ of any relevant runway), is not ground relevant runway traffic.

More generally, the EAMM system comprises a computer system programmed with software that executes the following algorithm when the TFC switch is in State 1: (1) when ownship is on the ground and outside the GRRZ of runway 32R, the EAMM will display all air and ground traffic with associated flight identifiers; and (2) when ownship is on the ground and inside the GRRZ of runway 32R, the EAMM will display all air and ground traffic with associated flight identifiers and, in addition, will display groundspeed data for all ground relevant runway traffic.

Although not shown in FIG. 6, it should be appreciated that any airborne traffic in the airspace above the area covered by the EAMM would also be displayed using appropriate distinguishing symbology. The EAMM will display a respective flight identifier in proximity to each airborne traffic symbol, the latter being positioned and oriented on the map to reflect the respective position and heading of each airborne aircraft relative to runway 32R. Optionally, the EAMM system is programmed to display the distance from ownship of all air relevant runway traffic or the airspeed and distance of all air relevant runway traffic (i.e., air traffic in and aligned with the AROZ of all relevant runways) in response to detecting ownship's entry into the GRRZ of runway 32R.

Figure 8:
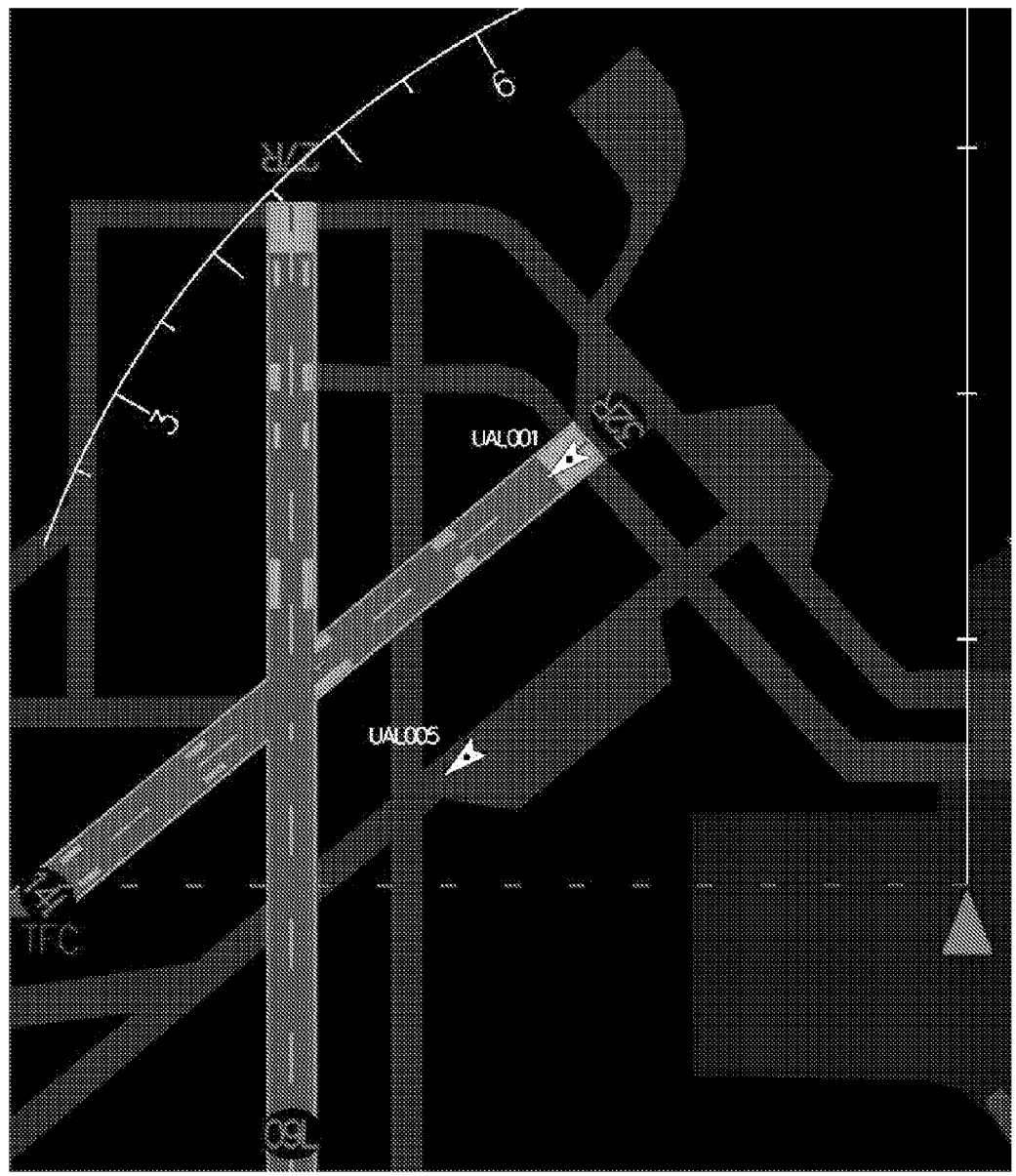
FIGS. 8 and 9 are diagrams depicting partial screen shots taken from the same screen shots from which the partial screen shots of FIGS. 6 and 7 were derived, but showing a larger area.
Figure 9:
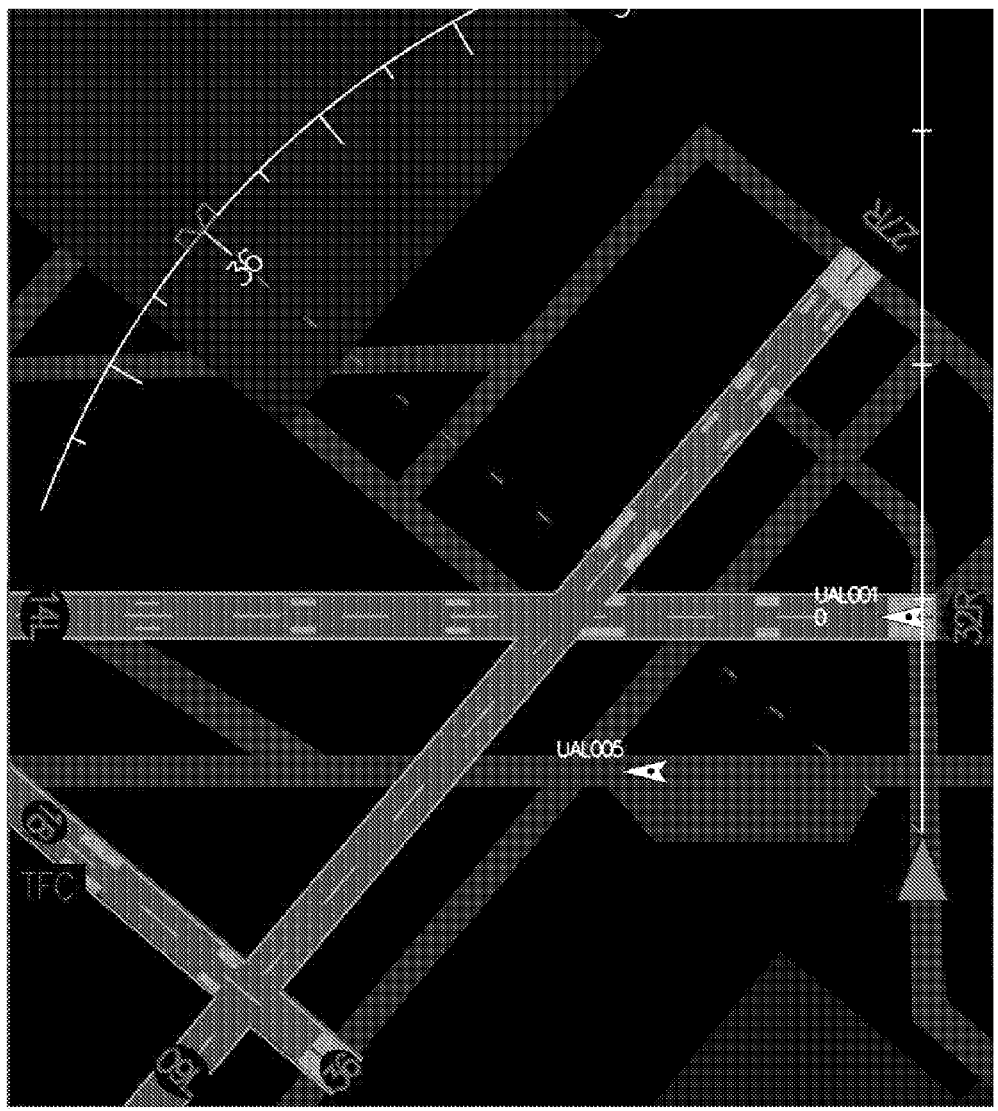

FIGS. 8 and 9 are diagrams depicting partial screen shots taken from the same screen shots from which the partial screen shots of FIGS. 6 and 7 were derived, but showing a larger area. Thus the circumstances (i.e., ownship and traffic positions) depicted in FIGS. 8 and 9 are the same as those described for FIGS. 6 and 7 respectively. In accordance with the scenario depicted in FIG. 8, ownship (represented by the triangle in the lower right-hand corner of the partial screen shot) is on the ground and located outside the GRRZ of runway 32R. Similarly, in accordance with the scenario depicted in FIG. 9, ownship (represented by the triangle in the lower right-hand corner of the partial screen shot) is on the ground and located inside the GRRZ of runway 32R.

Figure 10:
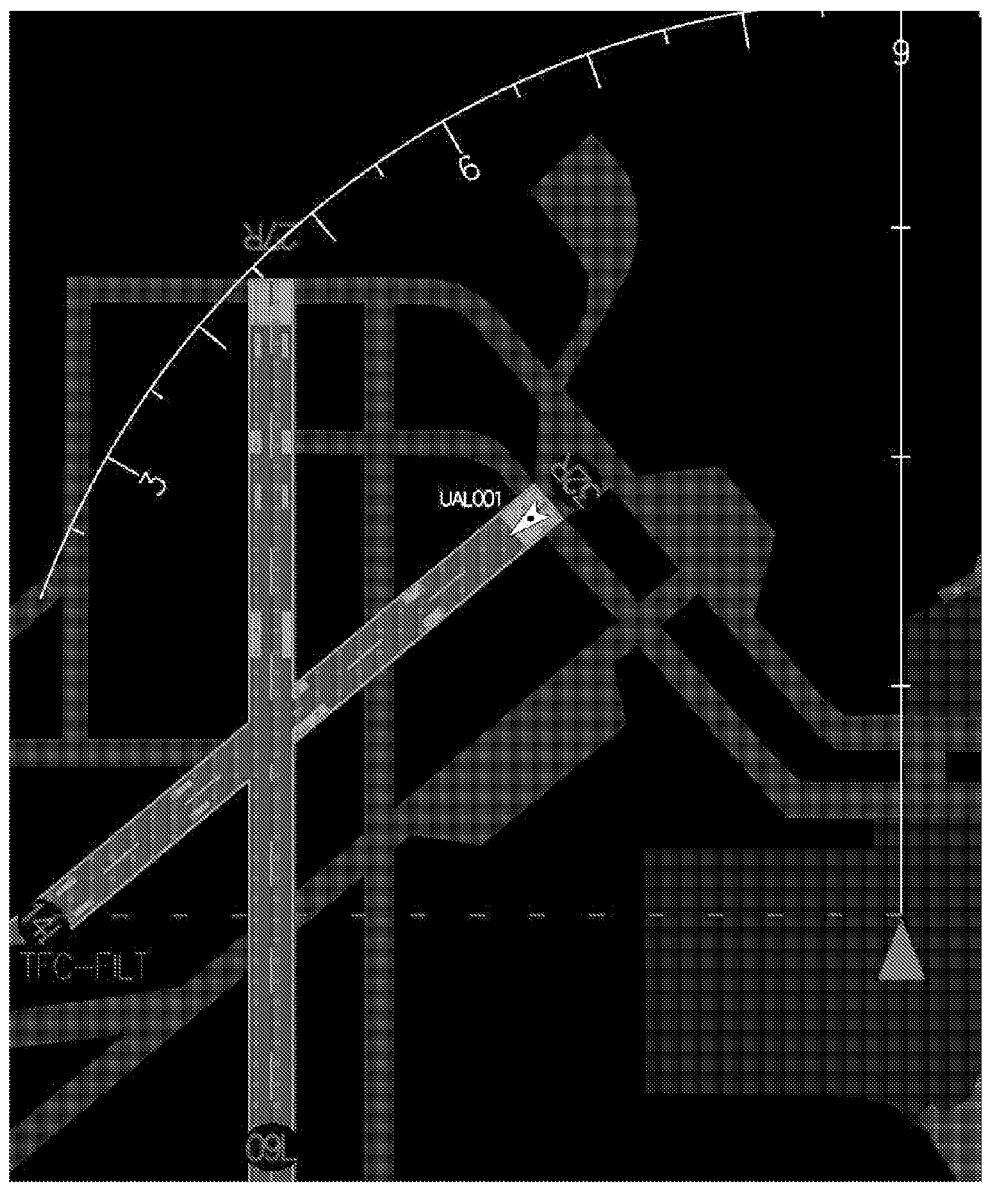
FIG. 10 is a diagram showing how the partial screen shot of FIG. 8 changes in response to ownship position and the pilot manually switching on a filtering function.

FIG. 10 is a diagram showing how the partial screen shot of FIG. 8 changes in response to the pilot manually setting the TFC switch to State 2 while ownship is outside the GRRZ. In general, this would have the effect of removing the symbols and identifiers for all non-runway ground traffic (i.e., when the TFC switch is in State 2, the EAMM system displays all air traffic and only ground runway traffic with identifiers). In the particular case depicted in FIG. 10, the symbol and identifier for Flight UAL005 are removed from the display, while the symbol and identifier for Flight UAL001 are displayed.

Figure 11:
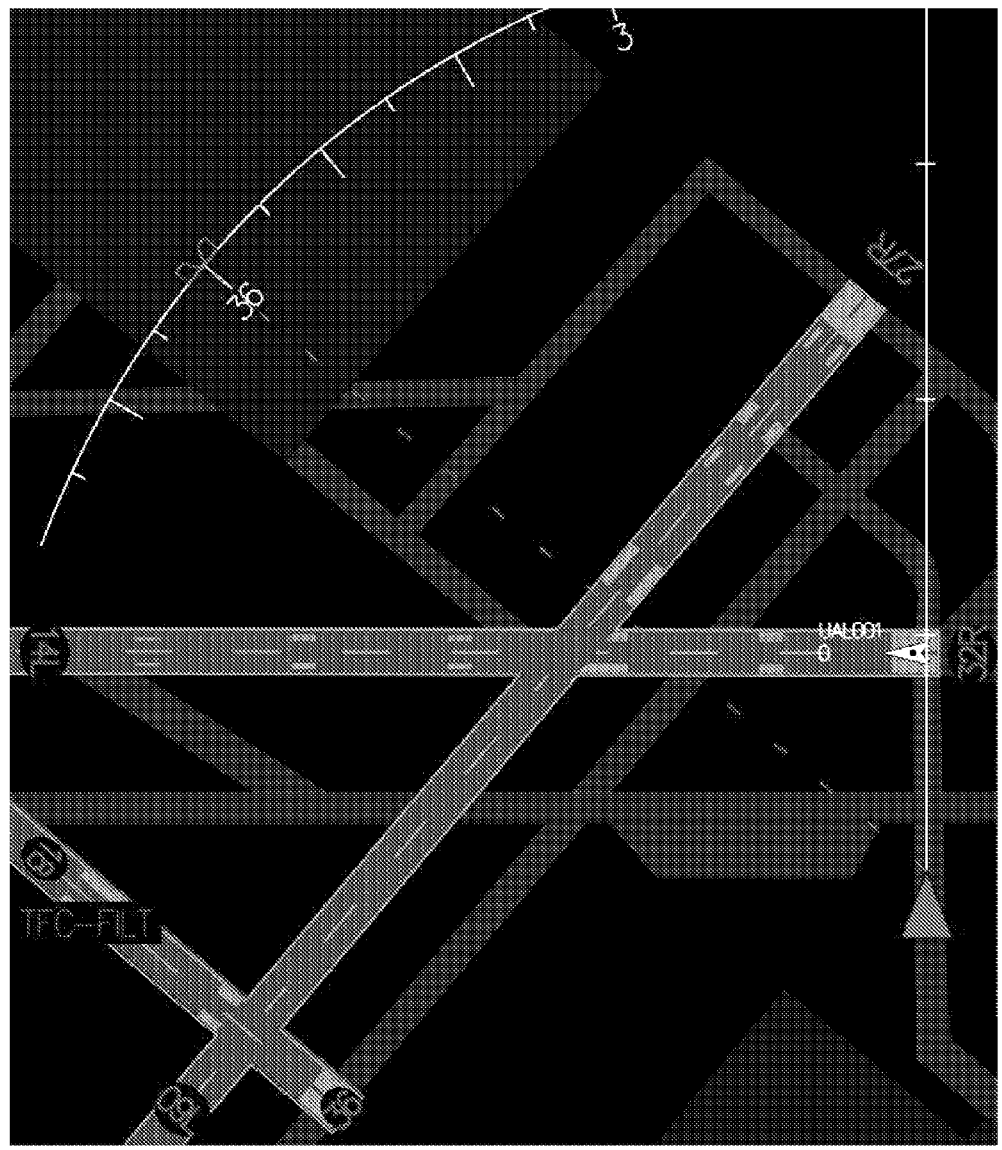
FIG. 11 is a diagram showing how the partial screen shot of FIG. 9 changes in response to ownship position and the pilot manually switching on a filtering function.

FIG. 11 is a diagram showing how the partial screen shot of FIG. 9 changes in response to the pilot manually setting the TFC switch to State 2 while ownship is inside the GRRZ. Again, the symbols and identifiers for all non-runway ground traffic are removed from the display screen, while the groundspeed data for ground relevant runway traffic is displayed. In the particular case depicted in FIG. 11, the symbol and identifier for Flight UAL005 are removed from the display, while the symbol, identifier and groundspeed datum for Flight UAL001 are displayed.

Figure 12:
FIGS. 12 and 13 are diagrams depicting partial screen shots from an EAMM display screen when a traffic switch is in a first state and the ownship speed is respectively 80 and 81 knots during takeoff or landing.
Figure 13:
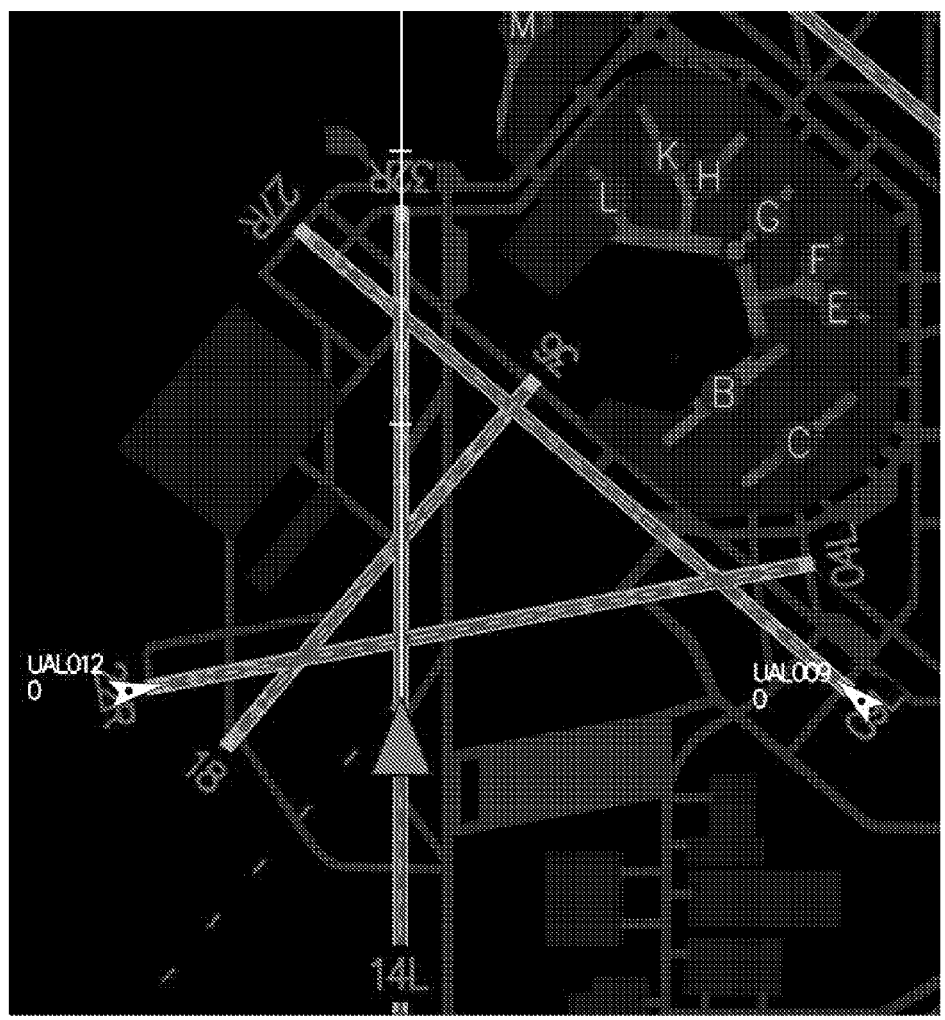

FIGS. 12 and 13 are diagrams depicting partial screen shots from an EAMM display screen when the TFC switch is in State 1 and the ownship speed is respectively 80 and 81 knots. During takeoff the display will transition from the screen shot partially depicted in FIG. 12 to the screen shot partially depicted in FIG. 13. Conversely, during landing the display will transition from the screen shot partially depicted in FIG. 13 to the screen shot partially depicted in FIG. 12. For this example, no air traffic is shown. However, it should be appreciated that the displayed air traffic is unaffected by the transition in ownship speed from not exceeding a threshold to exceeding that threshold and vice versa.

FIG. 12 shows a portion of an exemplary traffic display when the TFC switch is in State 1 and ownship speed equals an 80-knot threshold. Under these circumstances all ground traffic is displayed with identification (i.e., Flights UAL002-UAL009, UAL011 and UAL012), while groundspeed data is also displayed for all ground relevant runway traffic (i.e., Flights UAL009 and UAL012). In this case all air traffic with identification would be displayed, and identification and groundspeed or identification and distance would be displayed for all relevant runway air traffic.

FIG. 13 shows the same portion of this exemplary traffic display when the TFC switch is in State 1 and ownship speed equals 81 knots, which exceeds the 80-knot threshold. Under these circumstances all non-runway ground traffic is removed and only ground runway traffic with data is displayed. In this particular example, only symbols and data for Flights UAL009 and UAL012 are displayed. In this case all air traffic with identification would be displayed, and identification and groundspeed or identification and distance would be displayed for all relevant runway air traffic.

It should be appreciated that the threshold of 80 knots is merely one example. The threshold can be set at a level different than 80 knots, or different logic (e.g., ownship air/ground state may be used alone or in combination with ownship speed).

Figure 14:
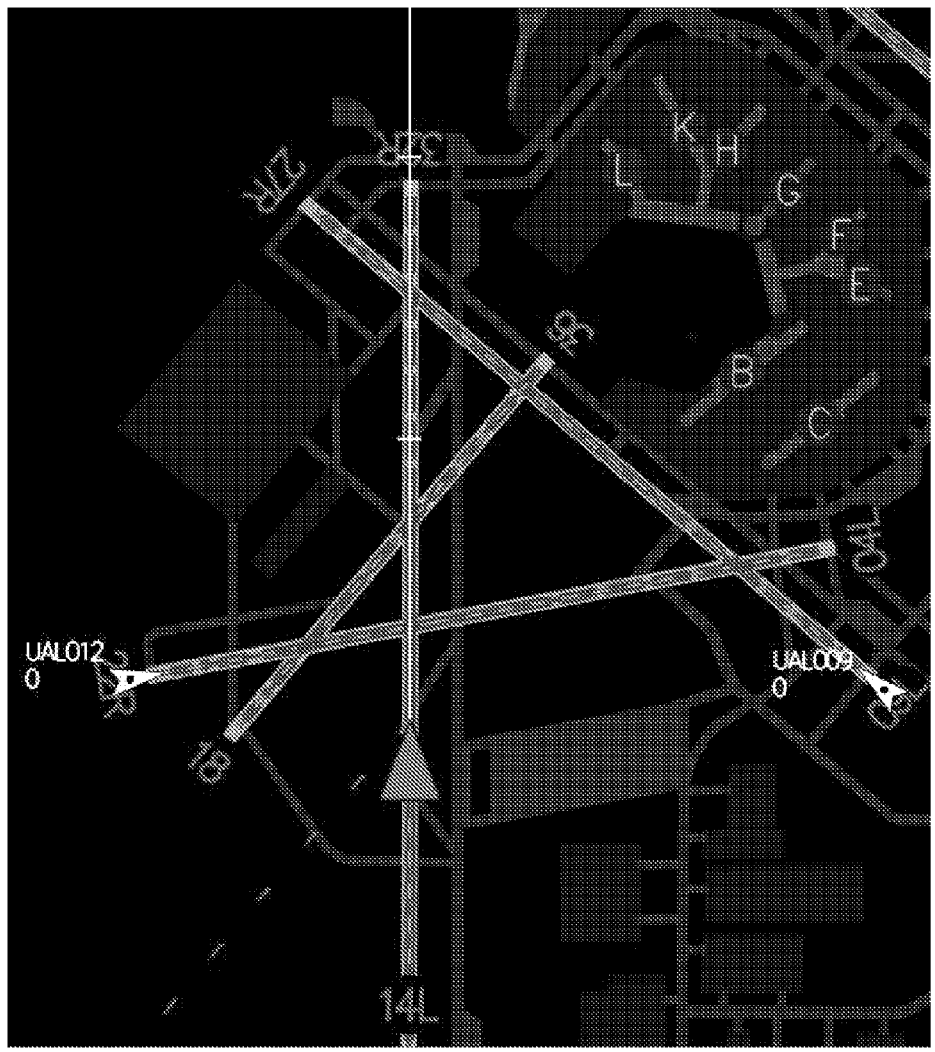
FIGS. 14 and 15 are diagrams depicting partial screen shots from an EAMM display screen when the traffic switch is in a second state and the ownship speed is respectively 80 and 81 knots during takeoff or landing.
Figure 15:
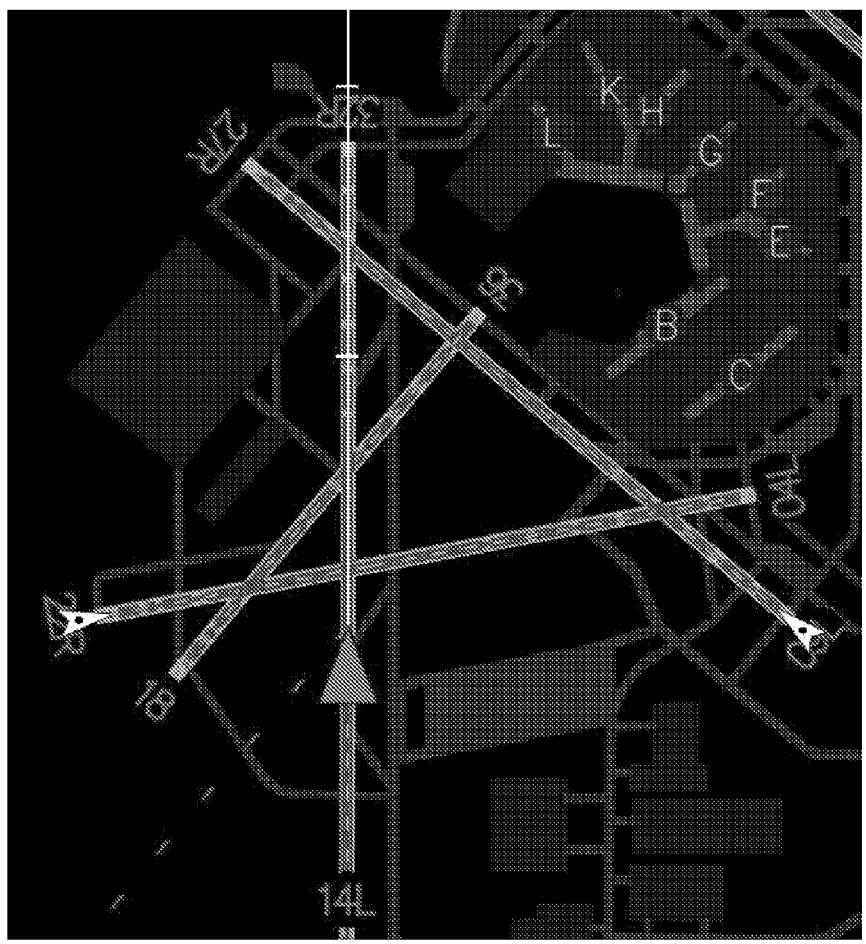

FIGS. 14 and 15 are diagrams depicting how the partial screen shots of FIGS. 12 and 13 would change if the TFC switch were set to State 2 instead of State 1 as ownship speed transitioned from 80 knots to 81 knots. During takeoff the display will transition from the screen shot partially depicted in FIG. 14 to the screen shot partially depicted in FIG. 15. Conversely, during landing the display will transition from the screen shot partially depicted in FIG. 15 to the screen shot partially depicted in FIG. 14.

FIG. 14 shows a partial screen shot for when the TFC switch is in State 2 and ownship speed equals 80 knots. Under these circumstances all air traffic and only ground runway traffic both with data is displayed. In this particular example, only symbols and data for Flights UAL009 and UAL012 ground traffic are displayed. (Note that the display screen for FIGS. 13 and 14 is the same.)

FIG. 15 shows the same portion of this exemplary traffic display when the TFC switch is in State 2 and ownship speed equals 81 knots (in excess of the threshold). Under these circumstances all air traffic and only ground runway traffic both without data is displayed. In this particular example, only symbols for Flights UAL009 and UAL012 ground traffic are displayed.

Again no air traffic is shown in FIGS. 14 and 15. However, it should be appreciated that any displayed air traffic would be displayed with traffic data when ownship speed is 80 knots and without traffic data when ownship speed is 81 knots.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims, the term "computer system" should be construed broadly to encompass a system having at least one computer or processor, and may have two or more interconnected computers or processors.

The invention claimed is:

1. A method for displaying traffic information on a moving map presented in a cockpit or flight deck of an airplane on a runway at an airport, comprising:
   (a) storing data defining a respective ground runway operating zone and a respective ground relevant runway zone for each runway at the airport, wherein each of said ground runway operating zones overlaps with and extends beyond a respective runway and each of said ground relevant runway zones overlaps with and extends beyond a respective ground runway operating zone;
   (b) receiving data indicative of the airplane's current location;
   (c) receiving data indicative of a respective current location of one or more other vehicles at the airport;
   (d) determining which of the other vehicles are ground traffic but not ground runway traffic and which of the other vehicles are ground runway traffic based on the current locations of the one or more other vehicles and the data defining the ground runway operating zones, the ground runway traffic being a subset of the ground traffic that includes traffic within said ground runway operating zones;
   (e) monitoring at least one of a speed, heading and track of the airplane;
   (f) when the airplane has a speed less than a threshold, displaying symbols representing the airplane and ground traffic at the airport on a moving map, each symbol representing a respective other vehicle of the ground traffic being positioned on said moving map to reflect at least one of respective location, heading and track of the respective other vehicle of the ground traffic relative to the location of the airplane; and
   (g) when the airplane reaches a speed greater than said threshold, ceasing display of the symbols representing vehicles of the ground traffic which are not ground runway traffic.

2. The system as recited in claim 1, wherein operation (d) comprises:
   determining whether the moving airplane has entered one of the ground relevant runway zones;
   if the current location of the airplane is within the ground relevant runway zone of a runway, identifying that runway as a relevant runway;
   if the current location of the airplane is within the ground runway operating zone of the relevant runway,
   determining whether the airplane is aligned within ±30 degrees of a centerline of the relevant runway;
   if the airplane is aligned within ±30 degrees of a centerline of the relevant runway, identifying the relevant runway as being an ownship runway;
   identifying other relevant runways associated with the ownship runway; and
   determining whether any of the other vehicles are located within the ground runway operating zone of any relevant runway associated with the ownship runway.

3. A system for displaying traffic information on a moving map presented in a cockpit or flight deck of an airplane on a runway at an airport, comprising:
   a display screen on which the moving map is displayed;
   a settable traffic switch which can be set to only one of a plurality of states, said plurality of states comprising first and second states; and
   a computer system programmed to perform the following operations:
   (a) retrieving data defining a respective ground runway operating zone and a respective ground relevant runway zone for each runway at the airport, wherein each of said ground runway operating zones overlaps with and extends beyond a respective runway and each of said ground relevant runway zones overlaps with and extends beyond a respective ground runway operating zone;
   (b) receiving data indicative of the state of said traffic switch;
   (c) receiving data indicative of at least one of the airplane's current location, speed, heading and track;
   (d) receiving data indicative of at least one of a respective current location, speed, heading and track of one or more other vehicles at the airport;
   (e) when said traffic switch is set to said first state, controlling said display screen to display symbols representing the airplane and ground traffic at the airport on a moving map, each symbol representing a respective other vehicle of the ground traffic being positioned on said moving map to reflect at least one of a respective location, heading, track, and speed of a respective other vehicle of the ground traffic relative to the location of the airplane; and
   (f) when said traffic switch is set to said second state, controlling said display screen to cease display of the symbols representing vehicles of the ground traffic which are not ground runway traffic on said moving map, wherein the ground runway traffic includes traffic within said ground runway operating zones.

4. The system as recited in claim 3, wherein said computer system is programmed to perform step (e) or (f) while a speed of the airplane is less than or equal to a threshold.

5. The system as recited in claim 3, wherein said computer system is further programmed to display traffic data for the traffic corresponding to all symbols displayed during step (e) or (f).

6. A system for displaying traffic information on a moving map presented in a cockpit or flight deck of an airplane on a runway at an airport, comprising:
 a display screen on which a moving map is displayed;
 a settable traffic switch which can be set to only one of a plurality of states, said plurality of states comprising first and second states; and
 a computer system programmed to perform the following operations:
receiving data indicative of the state of said traffic switch;
 receiving data indicative of the airplane's current location;
 receiving data indicative of a respective current location of one or more other vehicles at the airport;
 monitoring a speed of the airplane;
 when said traffic switch is set to said first state and the airplane has a speed greater than a threshold, controlling said display screen to display symbols representing the airplane and other vehicles at the airport as well as traffic data in proximity to said displayed symbols on said moving map, each symbol being positioned on said moving map to reflect a respective location of a respective other vehicle relative to the location of the airplane; and
 when said traffic switch is set to said second state and the airplane has a speed greater than said threshold, controlling said display screen to display symbols representing the airplane and other vehicles at the airport on said moving map without said traffic data.

7. The system as recited in claim 6, wherein said computer system is further programmed to retrieve data defining a respective ground runway operating zone for each runway at the airport, wherein each of said ground runway operating zones overlaps with and extends beyond a respective runway, and said other vehicles comprise vehicles located in any of said ground runway operating zones.

8. A system for displaying traffic information on a moving map presented in a cockpit or flight deck of an airplane on a runway at an airport, comprising a display screen and a computer system programmed to perform the following operations:
 (a) retrieving data defining a respective ground runway operating zone and a respective ground relevant runway zone for each runway at the airport, wherein each of said ground runway operating zones overlaps with and extends beyond a respective runway and each of said ground relevant runway zones overlaps with and extends beyond a respective ground runway operating zone;
 (b) receiving data indicative of the airplane's current location;
 (c) receiving data indicative of a respective current location of one or more other vehicles at the airport;
 (d) determining which of the other vehicles are ground traffic but not ground relevant runway traffic and which of the other vehicles are ground runway traffic based on the current locations of the one or more other vehicles and further based on the data defining the ground runway operating zones, the ground runway traffic being a subset of the ground traffic that includes traffic within said ground runway operating zones;
 (e) monitoring at least one of a speed, heading and track of the airplane;
 (f) when the airplane has a speed greater than a threshold, controlling said display screen to display symbols representing the airplane and vehicles of the ground traffic at the airport which are ground runway traffic on a moving map and to not display symbols representing vehicles of the ground traffic which are not ground runway traffic on said moving map; and
 (g) when the speed of the airplane decreases to less than said threshold, controlling said display screen to additionally display symbols representing vehicles of the ground traffic which are not ground runway traffic on said moving map, wherein each symbol representing a respective vehicle of the ground traffic is positioned on said moving map to reflect at least one of respective location, heading and track of the respective vehicle of the ground traffic relative to the location of the airplane.

9. A method for displaying traffic information on a moving map presented in a cockpit or flight deck of an airplane on a runway at an airport, comprising:
 (a) storing data defining a respective ground runway operating zone and a respective ground relevant runway zone for each runway at the airport, wherein each of said ground runway operating zones overlaps with and extends beyond a respective runway and each of said ground relevant runway zones overlaps with and extends beyond a respective ground runway operating zone;
 (b) receiving data indicative of the airplane's current location;
 (c) receiving data indicative of a respective current location of one or more other vehicles at the airport;
 (d) determining which of the other vehicles are ground traffic but not ground relevant runway traffic and which of the other vehicles are ground relevant runway traffic based on the current locations of the one or more other vehicles and the data defining the ground runway operating zones and the ground relevant runway zones, the ground relevant runway traffic being a subset of the ground traffic;
 (e) monitoring a speed, heading and track of the airplane;
 (f) when the airplane has a speed greater than a threshold, controlling a display screen to display symbols representing the airplane and other vehicles at the airport on a moving map and not displaying associated traffic data in proximity to said symbols; and
 (g) when the speed of the airplane decreases to less than said threshold, controlling said display screen to additionally display associated traffic data in proximity to said symbols on said moving map, wherein each symbol represents a respective vehicle of the ground traffic is positioned on said moving map to reflect at least one of respective location, heading and track of the respective vehicle of the ground traffic relative to the location of the airplane.

10. A system for displaying traffic information on a moving map presented in a cockpit or flight deck of an airplane on a runway at an airport, comprising a display screen and a computer system programmed to perform the following operations:
 (a) retrieving data defining a respective ground runway operating zone and a respective ground relevant runway zone for each runway at the airport, wherein each of said ground runway operating zones overlaps with and extends beyond a respective runway and each of said ground relevant runway zones overlaps with and extends beyond a respective ground runway operating zone;

(b) receiving data indicative of the airplane's current location;
(c) receiving data indicative of a respective current location of one or more other vehicles at the airport;
(d) determining which of the other vehicles are ground traffic but not ground runway traffic and which of the other vehicles are ground runway traffic based on the current locations of the one or more other vehicles and the data defining the ground runway operating zones, the ground runway traffic being a subset of the ground traffic that includes traffic within said ground runway operating zones;
(e) monitoring a speed, heading and track of the airplane;
(f) when the airplane has a speed less than a threshold, controlling a display, screen to display symbols representing the airplane and ground runway traffic at the airport and traffic data associated with the respective other vehicles on a moving map, each symbol representing a respective other vehicle of the ground runway traffic being positioned on said moving map to reflect at least one of respective location, heading and track of the respective other vehicle of the ground runway traffic relative to the location of the airplane; and
(g) when the airplane reaches a speed greater than said threshold, controlling said display screen to cease display of said traffic data associated with the symbols representing the other vehicles on said moving map.

11. The system as recited in claim 10, wherein said traffic data comprises a respective identifier and a respective groundspeed datum for each of said other vehicles.

12. A method for displaying traffic information on a moving map presented on a vehicle that is moving on the ground within an area, comprising:
(a) storing data defining a plurality of first zones within an area;
(b) storing data defining a plurality of second zones within said area, each of said second zones overlapping with and extending beyond a respective one of said first zones;
(c) receiving data indicative of at least one of the moving vehicle's location, heading, track, and speed within said area;
(d) receiving data indicative of at least one of a respective location, identity and groundspeed of one or more other vehicles within said area;
(e) prior to entry of the moving vehicle into one of the second zones, displaying symbols representing the vehicle and other vehicles located within said area and traffic data associated with the respective other vehicles on a moving map, each symbol representing a respective other vehicle being positioned on said moving map to reflect at least one of a respective location, heading, track, and speed of the respective other vehicle relative to the location of the moving vehicle, and the traffic data including respective vehicle identifiers in proximity with at least some of said symbols representing other vehicles and not including respective groundspeed datum for each of the other vehicles;
(f) determining whether the moving vehicle has entered one of the second zones;
(g) if the moving vehicle has entered one of the second zones, determining whether any of the other vehicles are located within the first zone associated with the second zone entered by the moving vehicle at a time of said entry; and
(h) if any of the other vehicles are located within the first zone associated with the second zone entered by the moving vehicle at the time of said entry, displaying a respective groundspeed datum for each of the other vehicles located within the first zone associated with the second zone entered by the moving vehicle at the time of said entry.

13. The method as recited in claim 12, wherein the vehicles are airplanes, the second zones are respective ground relevant runway zones of respective runways, and the first zones associated with the second zones are respective ground runway operating zones of the respective runways.

14. The method as recited in claim 13, wherein step (f) comprises
determining whether the moving airplane has entered one of the ground relevant runway zones, and
step (h) comprises
displaying a respective groundspeed datum for each of the other airplanes located within the ground runway operating zone associated with the ground relevant runway zone in which the moving airplane is located, the method further comprising:
(i) if the current location of the airplane is within the ground relevant runway zone of a runway, identifying that runway as a relevant runway;
(j) if the current location of the airplane is within the ground runway operating zone of the relevant runway, determining whether the airplane is aligned within ±30 degrees of a centerline of the relevant runway;
(k) if the airplane is aligned within ±30 degrees of a centerline of the relevant runway, identifying the relevant runway as being an ownship runway;
(l) identifying other relevant runways associated with the ownship runway;
(m) determining whether any of the other airplanes are located within the ground runway operating zone of any relevant runway associated with the ownship runway; and
(n) displaying a respective groundspeed datum for each of the other airplanes located within the ground runway operating zone of any relevant runway associated with ownship runway.

15. The method as recited in claim 14, wherein step (i) comprises determining which of other runways intersect or are closely spaced and parallel to ownship runway.

16. The method as recited in claim 15, wherein step (l) further comprises determining if an intersection of ownship runway and intersecting runways are in an ownship forward field of view.

* * * * *